(12) United States Patent
Steer et al.

(10) Patent No.: US 9,131,433 B2
(45) Date of Patent: *Sep. 8, 2015

(54) MINIMIZATION OF RADIO RESOURCE USAGE IN MULTI-HOP NETWORKS WITH MULTIPLE

(75) Inventors: David Steer, Nepean (CA); Koon Hoo Teo, Nepean (CA); Adrian D. Smith, Kanata (CA)

(73) Assignee: APPLE INC., Cupertino, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 13/424,523

(22) Filed: Mar. 20, 2012

(65) Prior Publication Data

US 2012/0176900 A1    Jul. 12, 2012

Related U.S. Application Data

(63) Continuation of application No. 10/683,182, filed on Oct. 10, 2003, now Pat. No. 8,149,707.

(60) Provisional application No. 60/446,617, filed on Feb. 12, 2003, provisional application No. 60/446,618, (Continued)

(51) Int. Cl.
| | |
|---|---|
| *G01R 31/08* | (2006.01) |
| *H04W 40/24* | (2009.01) |
| *H04L 12/721* | (2013.01) |
| *H04L 12/727* | (2013.01) |
| *H04W 28/08* | (2009.01) |

(Continued)

(52) U.S. Cl.
CPC ............ *H04W 40/246* (2013.01); *H04L 45/12* (2013.01); *H04L 45/121* (2013.01); *H04L 45/36* (2013.01); *H04W 28/08* (2013.01); *H04W 40/28* (2013.01); *H04W 84/22* (2013.01)

(58) Field of Classification Search
None
See application file for complete search history.

(56) References Cited

U.S. PATENT DOCUMENTS

| | | |
|---|---|---|
| 5,649,108 A | 7/1997 | Spiegel et al. |
| 6,052,718 A | 4/2000 | Gifford |
| 6,175,870 B1 | 1/2001 | Gawlick et al. |

(Continued)

OTHER PUBLICATIONS

Elizabeth M. Royer: "A review of current routing protocols for ad hoc mobile wireless networks"; IEEE Wireless Communications, Online, vol. 6, Apr. 1999, pp. 46-55; XP002283423; retrieved from Internet: <URL:www.ieee.org>; retrieved on Jun. 7, 2004; abstract; figs 1, 3, 4; p. 46, right col.—p. 49, left col.

(Continued)

*Primary Examiner* — Samina Choudhry
(74) *Attorney, Agent, or Firm* — Fay Kaplun & Marcin, LLP

(57) ABSTRACT

Packets in a multi-hop wireless network are routed based on the available link throughputs, network node congestion and the connectivity of the network in a manner that minimizes the use of radio resources and minimizes delay for packets in multi-hop system. The routing method also avoids congestion in the access network, especially near the network access points as provided by network access nodes. Each wireless network node maintains a link table for storing link conditions and associated route costs. Packets are routed according to the low cost route. Subsequent wireless network nodes evaluate whether a lower cost route is available and, if so, route the data packet according to the lower cost route. Every wireless network node transmits the data packet, a specified route and a time stamp indicated a time of the last data entry in the link table that was used to calculate the low cost route.

16 Claims, 7 Drawing Sheets

Related U.S. Application Data filed on Feb. 12, 2003, provisional application No. 60/446,619, filed on Feb. 12, 2003, provisional application No. 60/447,527, filed on Feb. 14, 2003, provisional application No. 60/447,643, filed on Feb. 14, 2003, provisional application No. 60/447,644, filed on Feb. 14, 2003, provisional application No. 60/447,645, filed on Feb. 14, 2003, provisional application No. 60/447,646, filed on Feb. 14, 2003, provisional application No. 60/451,897, filed on Mar. 4, 2003, provisional application No. 60/453,011, filed on Mar. 7, 2003, provisional application No. 60/453,840, filed on Mar. 11, 2003, provisional application No. 60/454,715, filed on Mar. 15, 2003, provisional application No. 60/461,344, filed on Apr. 9, 2003, provisional application No. 60/464,844, filed on Apr. 23, 2003, provisional application No. 60/461,579, filed on Apr. 9, 2003, provisional application No. 60/467,432, filed on May 2, 2003, provisional application No. 60/468,456, filed on May 7, 2003, provisional application No. 60/480,599, filed on Jun. 20, 2003.

(51) Int. Cl.
*H04W 40/28* (2009.01)
*H04W 84/22* (2009.01)

(56) References Cited

U.S. PATENT DOCUMENTS

| | | |
|---|---|---|
| 6,687,230 B1 | 2/2004 | Furutono et al. |
| 6,791,949 B1 * | 9/2004 | Ryu et al. ............... 370/254 |
| 6,850,492 B2 | 2/2005 | Chander et al. |
| 6,977,931 B1 | 12/2005 | Hadziomerovic |
| 7,085,279 B1 | 8/2006 | Kumar et al. |
| 7,126,918 B2 | 10/2006 | Roberts |
| 7,136,363 B2 | 11/2006 | Kangas |
| 7,142,512 B1 | 11/2006 | Kobayashi et al. |
| 7,142,524 B2 | 11/2006 | Stanforth et al. |
| 7,158,791 B2 | 1/2007 | Karino et al. |
| 7,280,545 B1 | 10/2007 | Nagle |
| 7,292,537 B2 | 11/2007 | Charcranoon |
| 7,394,776 B2 | 7/2008 | Lee et al. |
| 2001/0017723 A1 * | 8/2001 | Chang et al. ............ 359/128 |
| 2003/0037167 A1 * | 2/2003 | Garcia-Luna-Aceves et al. ............ 709/238 |
| 2003/0151513 A1 * | 8/2003 | Herrmann et al. ......... 340/573.1 |

OTHER PUBLICATIONS

Tanenbaum A S: "Shortest Path Routing"; Computer Networks, London: Prentice-Hall International, GB, 1996; pp. 348-365; XP00219337; ISBN: 0-13-394248-1; p. 348, paragraph 5.2.2.—p. 351; p. 355, paragraph 5.2.5.—p. 357; p. 359, paragraph 5.2.6.—p. 365.

Wei-Peng Chen; Hou, J.C.: "Dynamic, ad-hoc source routing with connection-aware link-state exchange and differentiation"; Global Telecommunications Conference, Globecom'02; Online; vol. 1, Nov. 17-21, 2002, pp. 188-194, XP002283454; Retrieved from Internet: <URL:www.ieee.org>; retrieved on Jun. 7, 2004; abstract; p. 188, left col—p. 191, left col.

* cited by examiner communication network 10

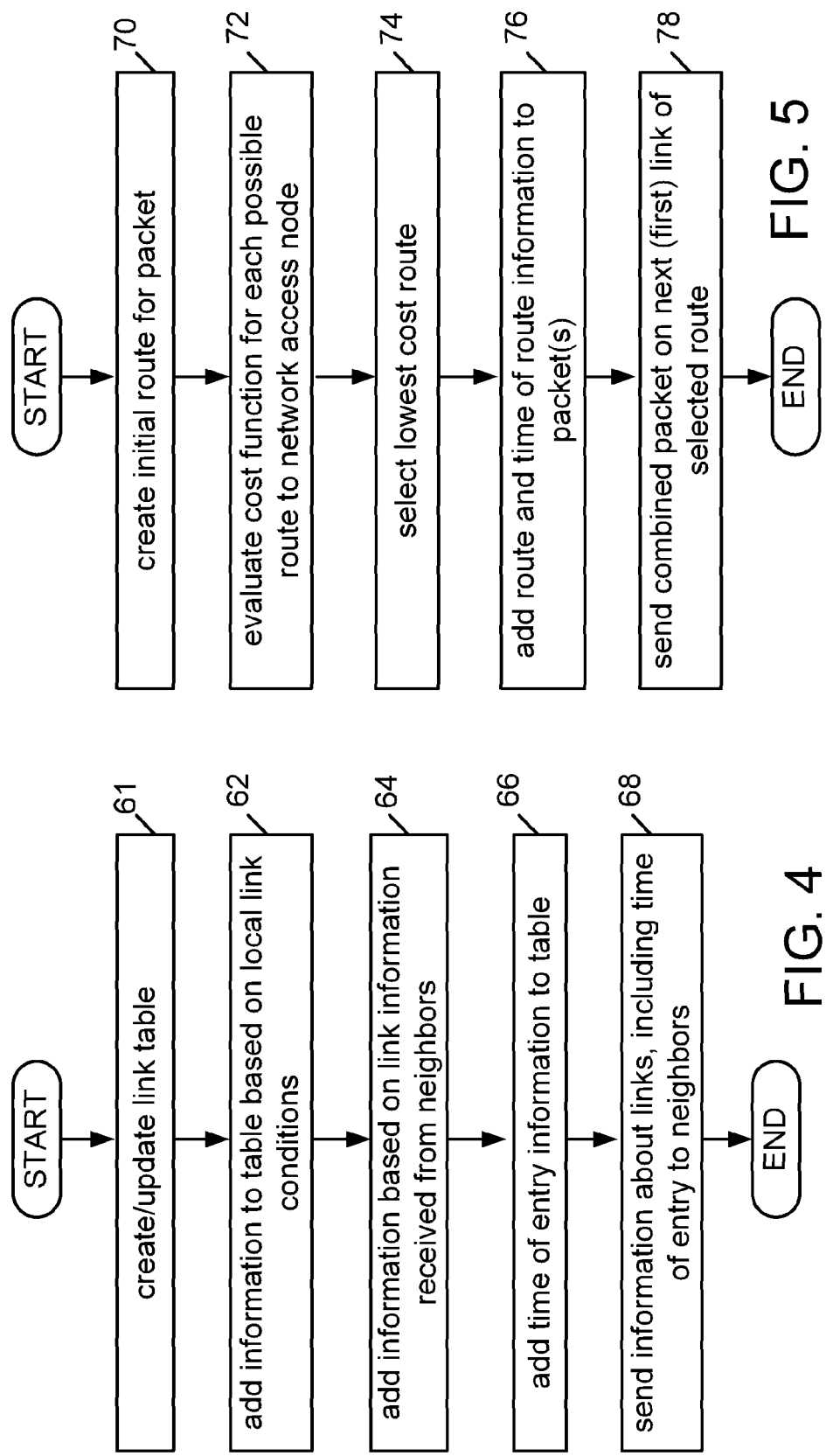

MINIMIZATION OF RADIO RESOURCE USAGE IN MULTI-HOP NETWORKS WITH MULTIPLE

CROSS REFERENCE TO RELATED APPLICATIONS

The present U.S. Utility Patent Application claims priority pursuant to 35 U.S.C. §120, as a continuation, to the following U.S. Utility Patent Application, which is hereby incorporated herein by reference in its entirety and made part of the present U.S. Utility Patent Application for all purposes:

1. U.S. Utility application Ser. No. 10/683,182, entitled "MINIMIZATION OF RADIO RESOURCE USAGE IN MULTI-HOP NETWORKS WITH MULTIPLE ROUTINGS," (Attorney Docket No. 15930ROUS02U), filed Oct. 10, 2003, pending, which claims priority pursuant to 35 U.S.C. §119(e) to the following U.S. Provisional Patent Applications, which are hereby incorporated herein by reference in their entirety and made part of the present U.S. Utility Patent Application for all purposes:

a) U.S. Patent Application Ser. No. 60/446,617 filed on Feb. 12, 2003 and entitled "System for Coordination of Multi Beam Transit Radio Links for a Distributed Wireless Access System," expired;

b) U.S. Patent Application Ser. No. 60/446,618 filed on Feb. 12, 2003 and entitled "Rendezvous Coordination of Beamed Transit Radio Links for a Distributed Multi-Hop Wireless Access System," expired;

c) U.S. Patent Application Ser. No. 60/446,619 filed on Feb. 12, 2003 and entitled "Distributed Multi-Beam Wireless System Capable of Node Discovery, Rediscovery and Interference Mitigation," expired;

d) U.S. Patent Application Ser. No. 60/447,527 filed on Feb. 14, 2003 and entitled "Cylindrical Multibeam Planar Antenna Structure and Method of Fabrication," expired;

e) U.S. Patent Application Ser. No. 60/447,643 filed on Feb. 14, 2003 and entitled "An Omni-Directional Antenna," expired;

f) U.S. Patent Application Ser. No. 60/447,644 filed on Feb. 14, 2003 and entitled "Antenna Diversity," expired;

g) U.S. Patent Application Ser. No. 60/447,645 filed on Feb. 14, 2003 and entitled "Wireless Antennas, Networks, Methods, Software, and Services," expired;

h) U.S. Patent Application Ser. No. 60/447,646 filed on Feb. 14, 2003 and entitled "Wireless Communication," expired;

i) U.S. Patent Application Ser. No. 60/451,897 filed on Mar. 4, 2003 and entitled "Offsetting Patch Antennas on an Omni-Directional Multi-Facetted Array to allow Space for an Interconnection Board," expired;

j) U.S. Patent Application Ser. No. 60/453,011 filed on Mar. 7, 2003 and entitled "Method to Enhance Link Range in a Distributed Multi-hop Wireless Network using Self-Configurable Antenna," expired;

k) U.S. Patent Application Ser. No. 60/453,840 filed on Mar. 11, 2003 and entitled "Operation and Control of a High Gain Phased Array Antenna in a Distributed Wireless Network," expired;

l) U.S. Patent Application Ser. No. 60/454,715 filed on Mar. 15, 2003 and entitled "Directive Antenna System in a Distributed Wireless Network," expired;

m) U.S. Patent Application Ser. No. 60/461,344 filed on Apr. 9, 2003 and entitled "Method of Assessing Indoor-Outdoor Location of Wireless Access Node," expired;

n) U.S. Patent Application Ser. No. 60/461,579 filed on Apr. 9, 2003 and entitled "Minimisation of Radio Resource Usage in Multi-Hop Networks with Multiple Routings," expired;

o) U.S. Patent Application Ser. No. 60/464,844 filed on Apr. 23, 2003 and entitled "Improving IP QoS though Host-Based Constrained Routing in Mobile Environments," expired;

p) U.S. Patent Application Ser. No. 60/467,432 filed on May 2, 2003 and entitled "A Method for Path Discovery and Selection in Ad Hoc Wireless Networks," expired;

q) U.S. Patent Application Ser. No. 60/468,456 filed on May 7, 2003 and entitled "A Method for the Self-Selection of Radio Frequency Channels to Reduce Co-Channel and Adjacent Channel Interference in a Wireless Distributed Network," expired; and r) U.S. Patent Application Ser. No. 60/480,599 filed on Jun. 20, 2003 and entitled "Channel Selection," expired;

This application also claims priority to and incorporates by reference the following application having at least one inventor in common, which application is entitled "Self-Selection of Radio Frequency Channels to Reduce Co-Channel and Adjacent Channel Interference in a Wireless Distributed Network" and having a Ser. No. 10/683,181, filed on Oct. 10, 2003, issued as U.S. Pat. No. 7,174,170 on Feb. 6, 2007.

TECHNICAL FIELD

The subject matter relates generally to wireless communication systems and, more particularly, to traffic routing between wireless network nodes and a network access node.

DESCRIPTION OF RELATED ART

The structure and operation of wireless communication systems are generally known. Examples of such wireless communication systems include cellular systems and wireless local area networks (WLAN), among others. Equipment that is deployed in these communication systems is typically built to comply with standardized operations, i.e., operating standards. These operating standards prescribe particular carrier frequencies, modulation types, baud rates, physical layer frame structures, medium access control (MAC) layer operations, link layer operations, signaling protocols, etc. By complying with these operating standards, equipment interoperability is achieved.

In cellular systems, a plurality of base stations is distributed across the service area. Each base station services wireless communications within a respective cell. Each cell may be further subdivided into a plurality of sectors. In most, if not all, cellular systems, carrier frequencies are reused so that interference between base stations using the same carrier frequencies is minimized and system capacity is increased. Typically, base stations using the same carrier frequencies are geographically separated so that minimal interference results. Similarly, a plurality of WLAN base stations (often called Access Points) is distributed across the service area. And, the carrier frequencies for these are also reused to minimize interference between access points.

Traditional wireless mobile networks include Mobile Station Controllers (MSCs), Base Station Controllers (BSCs) and Base Station Transceiver Sets (BTSs) jointly operate to communicate with mobile stations over a wireless communication link. The BSCs and BTSs collectively are referred to as BSs or base stations. The traffic from the user terminals is then routed across the network of base stations or access points to reach the destination user or to reach another network where the destination user or service is located. In the design of these networks the optimum assignment of carrier frequencies and the routing of traffic across the network are important factors in achieving the desired cost and performance of the system.

Wireless cellular communication service providers, as well as Internet service providers, are increasingly working together to provide seamless end-to-end call connectivity across the various platforms to enable users to establish point-to-point connections independent of terminal type and location. Traditionally voice networks have paved the way for the creation of data networks for carrying data packets that contain information of all sorts including voice.

Today, there are many forms of packet data networks, including various versions of the Internet in which a computer typically is coupled directly using a broadband access technology such as cable modems, digital subscriber line modems, etc. The next generation of cellular networks presently being developed is being enhanced from traditional systems to create the ability for mobile stations to receive and transmit data in a manner that provides greatly increased throughput rates. For example, many new mobile stations, often referred to as mobile terminals or access terminals, are being developed to enable a user to surf the web or send and receive e-mail messages through the wireless channel, as well as to be able to receive continuous-bit-rate data, including so called "streaming data". Accordingly, different systems and networks are being developed to expand such capabilities and to improve their operational characteristics.

In addition to the ongoing efforts to provide wireless data access through wireless cellular networks as described above, many developmental efforts are directed to building home and office wireless local area networks according to any one of a plurality of technologies and protocols. For example, Bluetooth and IEEE 802.11(b) provide for 2.4 giga-Hertz (GHz) band wireless networks. IEEE 802.11(a), on the other hand, provides for local area networks using the bands between 5.15 and 5.85 Giga-Hertz (GHz). In a home environment, only one or two access points may be needed to provide coverage for access to a wireless network node. In these and other environments, however with larger coverage areas, a multi-hop network is possible in which a plurality of wireless network nodes are used to collectively define a path from a mobile client to a destination node. Each intermediate wireless network node serves as a relay to receive communication signals from one wireless network node and to transmit the received communication signals to yet another wireless network node or network access node. Generally, a channel is established from each node to another defining the path to the network access node, which, in turn, provides access to an external network, such as the Internet. The channel may also be from one wireless network node to another in the same network when the destination is a user associated with the wireless network node.

Multi-hop networks are often advantageous for providing network access for a wireless client regardless of the underlying network, whether it is a cellular network or a wireless local area network. One problem with multi-hop networks, however, is that set-up and maintenance for multi-hop networks are labor intensive by their nature because the specific channels between wireless network nodes have required being manually pre-defined prior to use. Another problem relates to routing traffic through a multi-hop network in an efficient manner. In the simplest routing for a multi-hop network, nodes route their traffic to their nearest neighbor. In this routing plan, each node makes its selection of routes based only on local information about which of its neighbors is on the route towards the network access node. The packet traffic is forwarded in multiple hops with the choice of the next hop being made independently at each node. This simple process will assure that a packet will always reach the network access node. It does not, however, minimize the transit delay or the usage of radio resources along the route.

While the above procedure for routing traffic is simple and reliable, it does not route traffic in a manner to minimize radio resources. With the ever increasing demand for continuous-bit-rate data such as streaming audio and video, as well as the transfer of images and other large files, routing to minimize the use of radio resources is important because it affects the overall capacity of the access network and minimizes delay. When a packet is transmitted over a link, radio resources in the form of time and spectrum are used. These resources are thus unavailable for handling another packet either at the same node or (due to possible radio interference) at other neighboring nodes. Accordingly, it is desirable to minimize the use of radio resources for the routing of each packet so as to increase overall capacity of the network.

When nodes in the access network have links to multiple neighbors that may have different routes to the network access node or destination wireless network node, appropriate routes must be chosen for the packets. While the simple choice of the nearest neighbor can be applied to the multiple neighbor case, it has the disadvantage that there may be more hops than required and so introducing unnecessary delay and consuming excess radio resources. There may also be congestion of traffic in nodes that are closest to the network access node.

A method and apparatus for routing is needed therefore that can choose from among the multiple routes in a way that minimizes the usage of radio resources and the packet delay, compensates for congestion across the network and adapts to changes in the network configuration.

BRIEF DESCRIPTION OF THE DRAWINGS

FIG. 4 is a flow chart illustrating a method according to one embodiment of the invention;

FIG. 5 is a flow chart illustrating one aspect of a method according to one embodiment of the invention;

DETAILED DESCRIPTION OF THE DRAWINGS

Figure 1:
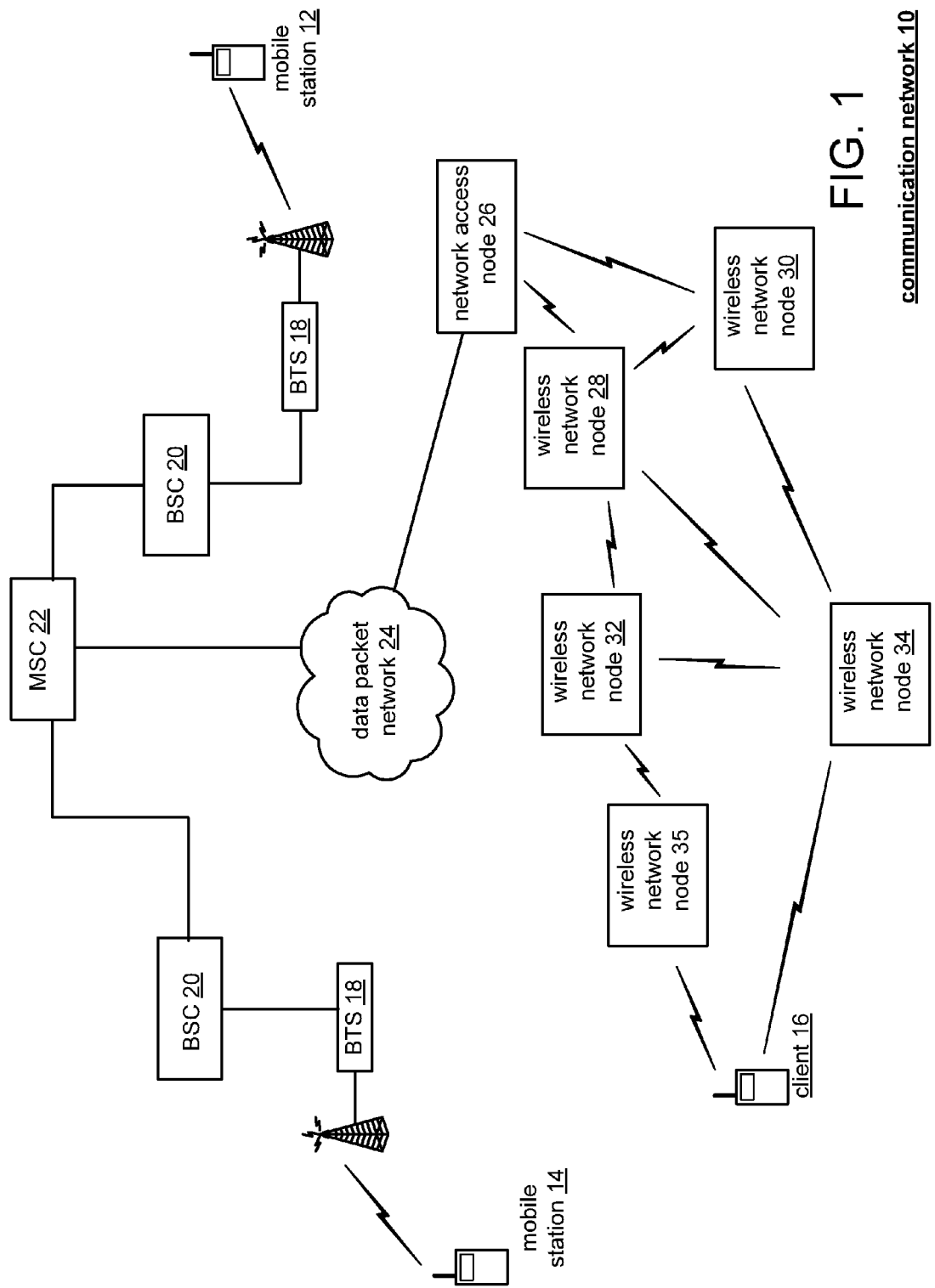
FIG. 1 is a functional block diagram of a communication network formed according to one embodiment of the present invention.

Described herein are routing packets based on the available link throughputs, network node congestion and the connectivity of the network in a manner that minimizes the use of radio resources and minimizes delay for packets in multi-hop system. The routing method also avoids congestion in the access network, especially near the network access points as provided by network access nodes. The routing method of this invention is distributed across the network, is tolerant to varying availability of routing information, is tolerant to errors in the routing tables and is adaptive to changes in the network connectivity and capacity.

More specifically, in a cluster of radio local wireless network nodes that are linked to a network access point (or node), it is likely that one or more of the nodes will be able to establish radio links to more than one of the neighbors in the cluster. The visibility of multiple neighbors will provide multiple options for routing the traffic towards the network access node or from the network access node towards the wireless network node. The traffic may be passed through several neighbors in a (multi-hop) chain to reach the destination node (or network access node). For this routing, decisions must be made, for example, if the traffic should simply be routed through the nearest neighbor (for further forwarding) or if the node should route its traffic beyond its immediate neighbors to reach as close as possible to the destination. In this choice the node must also consider that the rate of data traffic throughput on the various links will differ. For example, longer distance links reaching closer to the destination node may have a much lower throughput than the ones to the nearest neighbor (that is much closer). Transmission of packets on links closer to the network access node may also be more efficient due to the concentration of the traffic and the consequent lower radio operational overhead associated with each packet.

The route selection serves to provide balance between choosing direct routings for low delays and efficiencies to be gained through concentration of traffic in intermediate nodes. For example, if a wireless network node may select a route to one of two downstream wireless network nodes, a priority consideration is to minimize a number of hops to a destination network access node. On the other hand, transmission efficiencies must also be considered. If the link to the farther wireless network node is significantly less efficient because of interference or other path loss factors, it may be preferable to select a route including a hop to the closer wireless network node even though such a selected route would include at least one more hop in the route to the destination node (wireless network node or network access node).

As such, minimization of radio resources is sought when routing across the access network. The method and apparatus have, in general, three aspects. The first aspect is determining what links are available for routing across the network, the cost factors associated with each link and the development and updating of a routing information table in each node. The second aspect includes initiating a route based on a cost function and the information in an initiating wireless network node's routing table about the network. The third aspect is the updating of the routing while the packet is in transit if the network conditions change from those used by previous nodes to select the initial routing.

Together these three phases provide a robust and efficient method for routing packets across a multi-hop, mesh connected network that provides multiple routes to a destination. Link efficiency, congestion and other such parameters are calculated by the wireless network nodes based, at least in part, on monitoring and evaluating time delays and error rates for data packets sent through the various links and routes. In one embodiment, the time of transmission from the wireless network nodes is used to determine the delays that are experienced for packets transiting the network.

FIG. 1 is a functional block diagram of a communication network formed according to one embodiment of the present invention. A communication network 10 is configured to allow a plurality of mobile stations, such as mobile stations 12 and 14 of a cellular network and a client 16 of a wireless local area network (WLAN), to communicate with each other regardless of geographic location as long as they are located an area that is served by a service node (e.g., a wireless network node). While client 16 may be any type of wireless communication device, one typical client 16 comprises a wireless host coupled to a data terminal that receives and transmits data for a particular application. Collectively, herein, the wireless host that transceives data for the wireless terminal and the terminal are referenced herein as a client. Alternatively, a client may also comprise a terminal having wireless capability integrated therein.

As may be seen, each of the mobile stations 12 and 14 communicate by way of a base station transceiver system (BTS) 18, a base station controller (BSC) 20, and a mobile switching center (MSC) 22. As is known by one of average skill in the art, MSCs, such as MSC 22, provide network switching for cellular traffic according to a mobile station's location. More specifically, each MSC is coupled to at least one BSC, which, in turn, is coupled to at least one BTS. The operation of cellular networks as represented by MSC 22, BSC 20, and BTS 18 is generally known by one of average skill in the art.

Continuing to examine FIG. 1, MSC 22 also is coupled to a data packet network 24. Data packet network 24 includes any and all types of data packet networks, including any one of the known Internets, including those that operate under IP.v6 protocols. Data packet network 24 is further coupled to a network access node 26. Network access node 26 provides access to data packet network 24 for wireless network nodes that couple directly to network access node 26 or that couple to network access node 26 by one or more wireless network nodes to provide access for client 16.

Data packet network 24 is further coupled to network access node 26 by way of a wireline link (though a wireless link could be utilized). Network access node 26 is coupled, by way of wireless links, to wireless network nodes 28 and 30. Generally, the underlying technology or physical layer enables network access node 26 to only communicate directly with wireless network nodes 28 and 30 in the described embodiment. Wireless network node 28 is capable of communicating with wireless network nodes 32 and 34, as well as wireless network node 30. Wireless network node 30 is also coupled to wireless network node 34. Finally, wireless network node 32 is coupled to communicate with wireless network node 35. Wireless client 16 is within range and is communicatively coupled with wireless network nodes 34 and 35.

For the sake of simplicity, the network of FIG. 1 is depicted as having a number of wireless network nodes that are distributed about the region to be covered and are linked together, and to the main communications network, with transit radio links. The term "node", as used in conjunction with the description of the present invention, contemplates a component having a co-located access and transit functionality or it may include only transit functionality. The wireless terminals communicate with the nodes using the access radio links, and the traffic is forwarded between the wireless network nodes using the transit radio links to reach the network access node and the communications network. It is also possible for the traffic to be forwarded between the nodes to reach another terminal that is also attached to the same local area network.

In the "uplink", a packet flow is toward the communications network, and in the "downlink" the packet flow is toward the wireless network node that has coverage for the subscriber's terminal. Wireless access radio systems of the type to which the invention is particularly useful typically operate in packet mode, meaning they are only active (transmitting or receiving radio signals) when they are sending or receiving a packet; otherwise, they are quiescent, "listening" for traffic and occasionally exchanging signaling messages for administration of the radio system, but otherwise quiet.

The nodes may have links to multiple neighbors and these may offer alternate routing for packets among the nodes and to the network access node. As illustrated in FIG. 1, wireless network node 34 may route its packets towards the network access node 26 via any one of its neighbor wireless network nodes 28, 30, or 32. Wireless network node 34 must, therefore, include logic for choosing an appropriate route and, more particularly, between wireless network nodes 28, 30 and 32. As the different routes may have different delays and radio transmission conditions, the choice of an optimum route must consider information on radio link performance and cost across the network.

In this wireless access system, a node in the form of a wireless network node (routing point) is typically provided that features both access and transit capabilities. Access capabilities are afforded by the provision of one or more directional antennas for communication with wireless terminals of a variety of different types (wireless enabled PDAs, personal computers, hybrid telephony-data terminals, and the like). The access antennas can optionally be in the form of omni-directional antennas, or an array of directional antennas arranged to provide up to 360 degree coverage. Preferably, at least two access antennas are provided per node for diversity purposes. Alternatively, the access capabilities can be provided by one or more directional antennas, in the event it is desirable to have a more focused access coverage area. Transit capabilities are afforded by an array of directional antennas that provide for directional communication with other nodes or, for example, wireless backhaul. The provision of two or more directional antennas is contemplated for the directional antenna array; preferably six or more antennas are provided to afford a sufficient degree of directionality for each antenna. The antennas of the directional array preferably also are arranged to include diversity, which may be in the form of space or polarization diversity. The use of polarization diversity has the advantage that a more compact array may be implemented. In one embodiment, an antenna system having six dual polarized directional antennas is used for transmitting along 1 of 6 beams with a corresponding orthogonal polarization.

While FIG. 1 describes the multi-hop operation according to the present invention for client 16 and the wireless network nodes 28-35 that create a path or route to network access node 26, it is understood that the invention applies with equal force to any other multi-hop configuration. For example, if a multi-hop topology is implemented to provide traffic routes for mobile stations 12 or 14, the invention could be implemented therefor as well.

In operation, client 16 establishes a communication link with one of wireless network nodes 34 or 35. In the case of client 16 establishing a link with wireless network node 35, wireless network node 35 would initiate the first link to wireless network node 32 only because it is not communicatively coupled to any other wireless network node. Wireless network node 35, however, would generate route information for transmission with the traffic (data packets) from client 16 defining the subsequent wireless network nodes in a specified route to network access node 26. For example, the route information could specify that the traffic be routed either through wireless network node 34 or 28 from wireless network node 32. The subsequent wireless network node 28 or 34, upon receiving the traffic with routing information, compares the routing information to its own routing information and determines, in case of conflict or difference, which is more current. The subsequent wireless network node 28 or 34 then routes the traffic to the next link according to the routing information that is most current. Downstream wireless network nodes in the route to network access node 26 operate in a similar manner to create a route for data packets between client 16 and, in the example of FIG. 1, data packet network 24. In this example, the originating wireless network node 35 has only one route available (to node 32). Node 35 need not do any routing, it could simply send all its traffic to node 32. Here, node 32 would contain the routing information and determine the most cost effective routing.

Each wireless network node of FIG. 1 includes an access radio system, a transit radio link radio system and a communications controller unit. The access radio system may use a bi-directional radio system, such as defined by the IEEE 802.11 standard, or any other standard for wireless communications, including any known cellular standard or other wireless technologies, such as Bluetooth. Equipment for 802.11 and Bluetooth systems is widely available and is of low cost. For conducting traffic between the access radio system and the appropriate transit link, there is a communications controller unit that receives the packets (to/from) the access radio, stores them briefly (if needed) in suitable memory, determines the appropriate transit radio link, and forwards/receives them through the transit radio link to reach their destination. The transit radio system preferably utilizes a bi-directional standard such as the IEEE 802.11, but operates at a different radio frequency to avoid interference with the access radio system, i.e., the standard IEEE 802.11(b) operates in channels in the 2.4 GHz radio band and the IEEE 802.11(a) operates in channels in the bands between 5.15 and 5.85 GHz. The access system is also applicable to other sets of frequencies for one or both the access and transit aspects of operation, and to the application of other radio system standards such as IEEE 802.16(a).

Using WLAN technologies such as 802.11 (as illustrated above) or alternatively using IEEE 802.16 is increasingly becoming a very cost effective means to deliver data service. Utilization of the teachings of the present invention—by providing efficient routing for packets—will provide a cost effective solution for high rate data service to hot spots or selective areas.

This invention improves upon the capability of the existing standards (such as the 802.11) in a compatible way that enables the software upgrade of existing commercial devices to be used in the distributed multi-hop wireless access system. This technique will enable a vendor's products to better handle packets, including general data packets, as well as Voice-over-IP and video services. This invention is applicable to and relates to any air interface such as cdma2000, UMTS, GPRS, and other air interface technologies. In general, the specific embodiment of the described invention includes the portion of the network of FIG. 1 that comprises wireless local area network. The reference to wireless network nodes and, more generally, to nodes, should be considered to apply not only to wireless network nodes in a WLAN, but also to corresponding access points of a cellular network.

Figure 2:
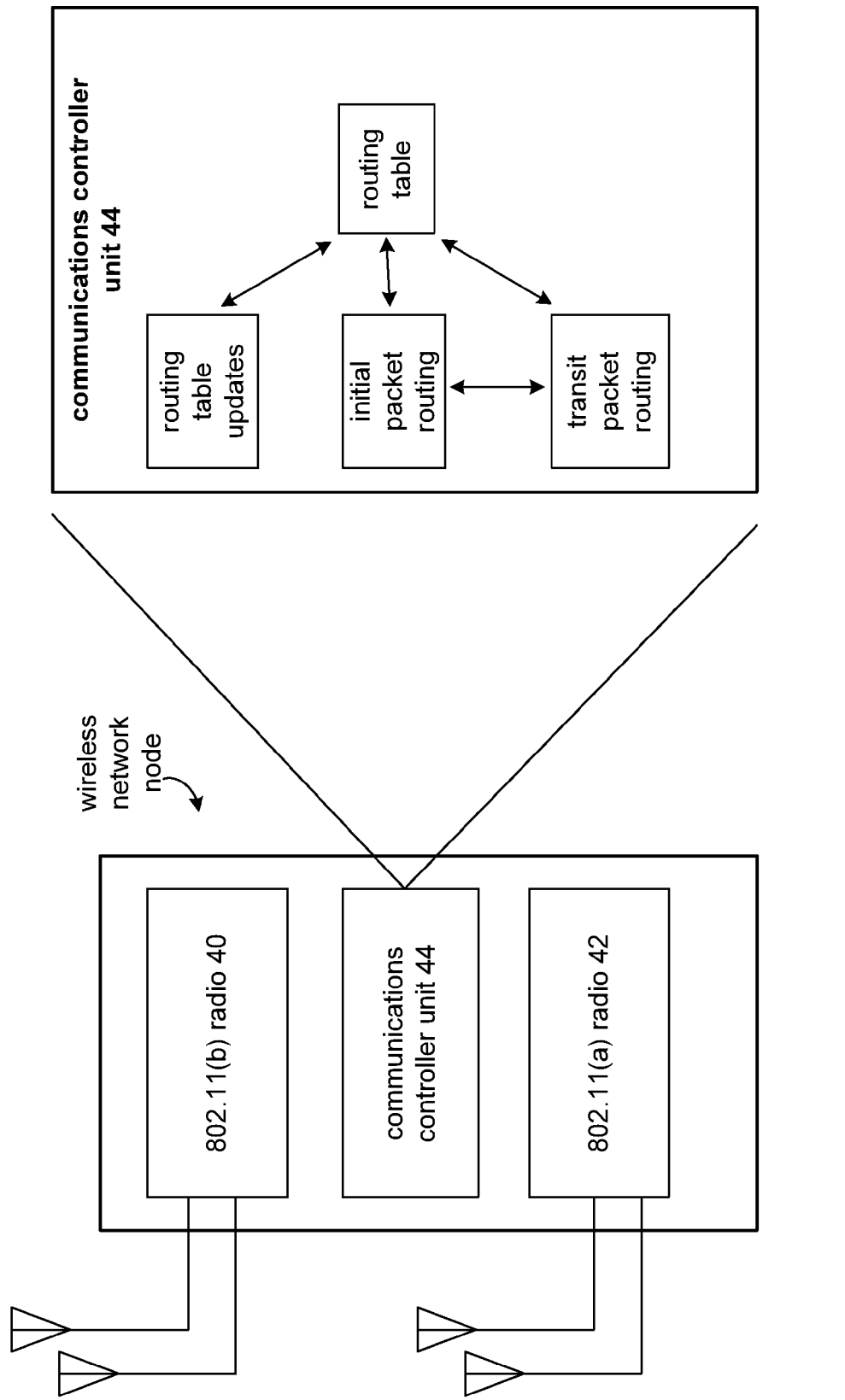
FIG. 2 illustrates a functional block diagram of an access controller.

FIG. 2 illustrates a functional block diagram of a wireless network node with circuitry to act as an access controller. The wireless network node of FIG. 2 represents any one of wireless network nodes 28, 30, 32, 34 or 35. For simplicity, wireless network node 34 is specifically described. Wireless network node 34 includes an IEEE 802.11(b) radio 40, an 802.11(a) radio 42 and a communications controller unit 44. As may further be seen, communications controller unit 44 includes logic for creating a routing table in a multi-hop wireless network, logic for updating the routing table, logic for initiating packet routing and logic for determining whether to update and change packet routing for a received packet. The specific details of the operation according to these logic blocks are as described in the process steps disclosed herein.

Figure 3:
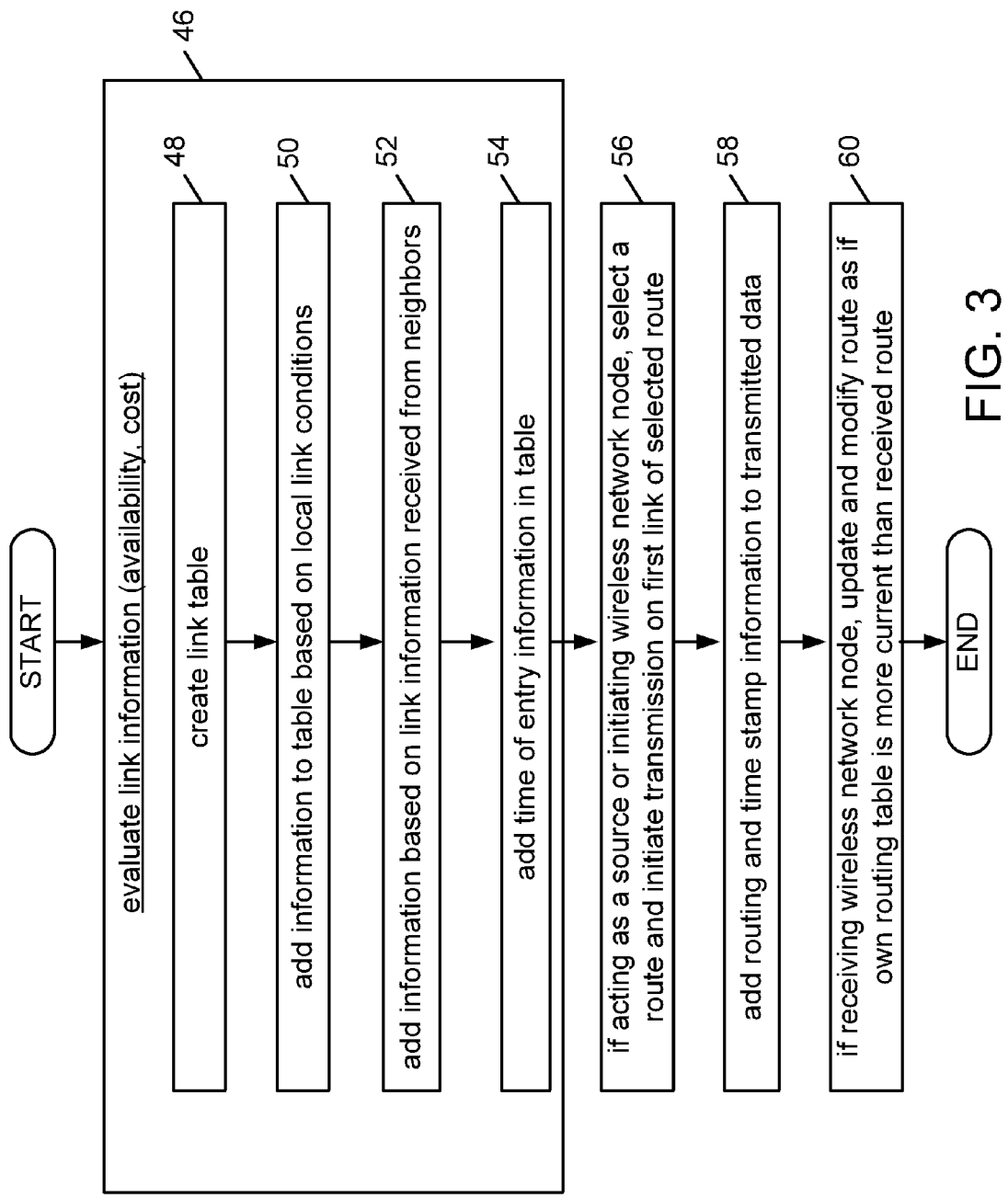
FIG. 3 is a flow chart illustrating operation of one embodiment of a wireless network node according to the present invention.

FIG. 3 is a flow chart illustrating operation of one embodiment of a wireless network node according to the present invention. Generally, the method of FIG. 3 illustrates a method for minimizing the use of radio resources when routing across the access network. Initially, a wireless network node (each wireless network node in the multi-hop network of the described embodiment of the invention) evaluates link information (step 46). This step generally includes evaluating link availability and cost. This step also generally includes periodic, or occasional updating, evaluated link availability and cost information.

More specifically, step 46 includes steps 48-54. Thus, the wireless network node creates a link table (step 48), adds information to the link table based on local link conditions (step 50), adds information to the link table based on link information received from neighbors (step 52) and, finally, adds a time of entry into the table each time that data is added or updated to the table (step 54). Accordingly, a type of time stamp is utilized to enable wireless network nodes to determine which data is most current when preferred route information is in conflict, as will be described in greater detail below.

In addition to evaluating link information in step 46, the wireless network node (when initiating transmission of a packet), selects an optimum route based upon the evaluations of step 46 and initiates transmission on a first link of the selected optimum route (step 56). Generally, this step includes an initiating wireless network node selecting a route based on a cost function and the information in its routing table about the network. The initiating wireless network node also adds routing and time stamp information to the data that is being transmitted (step 58). Finally, the invention includes, if the wireless network node received a packet with routing information, determining whether a lower cost route exists than what is specified with the received routing information and, if so, transmitting the packet on a link for the newly determined route wherein the packet includes the newly determined route information (step 60). Step 60 generally includes updating the routing information while the packet is in transit if the network conditions change from those used by previous nodes to select the initial routing. Together these steps provide a robust and efficient means to route packets across a multi-hop, mesh-connected multiple route network.

With respect to step 46, evaluating link information includes developing a routing table for a multi-hop, multi-route network that is based on a "cost function" for each of the possible alternate routes in the described embodiment of the invention. The radio resource cost for one of the routes to the network access node may be simply the sum of the radio transmission time required for the packet for each hop in the chain to the network access point. The radio transmission time for a link may be calculated, for example, from the quotient of the packet size and the data transmission rate for the link. The use of radio resources will be minimized if a routing is chosen that minimizes this sum. Thus, in the event that multiple routings are available, the node may evaluate the sum for each possible route and choose the route with the minimum sum specified in the routing table. If there are multiple routes to different network access nodes to the wired network (or to the destination wireless network node), the minimum sum route should still be chosen to minimize the use of radio resources.

To determine the sum, the node must know the rates available on all the links to the desired end node (which may be either another node in the access network or the network access node). This information may be obtained from the other nodes. Each node can determine the transmission rate and efficiency for each of its links. The link information is communicated among the nodes by the exchange of messages. These messages would report the latest availability of links and their data rates. From this combination of information about its own links, together with information about other links received from other nodes in the network, each node would be able to construct a table of the available links in the network and the data rate on each of these links and other information about the links (as will be discussed later). The information in this table would be shared among the neighbors to aid with their routing plans. As the availability of the links and their data rates may change over time due to changing traffic conditions or radio interference, the table is updated as conditions change and the new information exchanged with the nodes in the network. Thus, the routing would automatically be kept up-to-date with changing radio conditions, interference and link availability.

As mentioned earlier, the radio resources used for a packet is affected not only by the transmission rate (which together with the size of the packet determines the time required for transmission), but also by the efficiency of the link. As the radio transmission system requires the transmission of some overhead information in addition to the packet, the cost of transmitting a packet may be reduced if the overhead can be shared among a group of packets sent together on a link. Thus, the table of link information should include not only the transmission rate for each link in the network, but also the efficiency of the link. This efficiency may be expressed as a factor that is used by the node to multiply by the packet size-link rate quotient to determine the net cost of the link.

As an example, a single packet sent over a link may incur a thirty-percent overhead. So a link that is largely idle would have an efficiency factor of 1.3. Packets routed over this link would incur a cost increased by 1.3 as they would bear the full overhead. A link that is already busy with packets would be able to spread the overhead over multiple packets and so each would incur a lower overhead. A link that is already busy with traffic may thus have an efficiency factor of 1.05 indicating that there is only a five-percent cost addition for routing a packet over that link. Thus, in measuring the performance of each link, the nodes would record the transmission rate together with the occupancy that may be recorded as an efficiency factor. This information for each link would be exchanged among the nodes in the network to enable the optimum routing to be selected.

This information about the links in the network is exchanged through messages among the nodes in one embodiment of the invention. The information is transported together with the packets as they pass through the networks in an alternate embodiment of the invention. Information about the quality of the links traversed along the route could be added together with the payload packet ("piggy-backed"). The nodes along the route would thus gain the most recent information on the link conditions with each packet. This minimizes the overhead required for transmission of the network information. In yet another embodiment of the invention, the system uses a combination of both piggy-backed and dedicated information packets. Some links may have little traffic and hence need dedicated messages to report their conditions, while frequently used links would be updated using the piggy-backed information packets. The traffic flows may be different in each direction of a link between two nodes, and so the link parameters (rate and efficiency) will need to be recoded in the link table separately for each direction. As an example, the transmission rate and efficiency for a link from a first node to a second node will be different than the transmission rate and efficiency for the link from the second node to the first node.

The delay experienced by packets as they pass through the nodes in the network is another measure of performance. The delay a packet experiences in a node may be caused, for example, by queues as the packet, or a group of packets, waits for the transit radio link to become available. They also may be delayed because the radio unit in the node may be busy communicating other packets to other nodes. The best route for the packet should also minimize the delay in transiting the network. Thus, the information exchanged among the nodes about the link performance should also include the node delay for packets on the links. This information may also be summed for each possible route by the node when choosing a route and the routing selected that minimizes the cost of radio resources and delay chosen. This might be, for example, by choosing the route with the lowest product of radio resource cost sum and the delay sum.

As the network connections and radio conditions change over time, information in the table may be updated. Some information in the table may also become out-dated or even invalid due to changes in the network over time. To compensate for possible errors in the routing table, the table should also include an entry indicating the time the table entry was made.

The above-described embodiments utilize a table for the collection of the routing information held by each node in the network. One of average skill in the art may readily determine how to create a data structure for functionally creating such a table or for storing such data. Alternatively, lists of link parameters or integration of the information as parameters in the associated operating program may be used to implement the routing concepts of this invention. Alternatively, a database structure may be used.

The wireless network node initiating the routing of a packet in step 50 selects a route based on the information available in its routing table. A routing that minimizes the use of radio resources is selected by choosing the route that has the minimum sum over each link in the route of the packet transmission time multiplied by the efficiency for the link. The initiating node may determine the cost for each route by summing the entries for that route in its routing table, and selecting the one with the lowest cost and delay. The packet would then be sent to the first neighboring node in the chosen route. The packet is accompanied by additional information, according to step 52, concerning the source node, the end node, the proposed routing, and the time of the most recent information in the table used to develop the route in the described embodiment of the invention.

The above discussion assumes, however, that there is no congestion at any of the nodes along the route to the desired end node. With the traffic flowing towards the network access point, it is to be expected that the nodes in the neighborhood of the network access point (and the network access node itself) may become saturated (a node's radio resources are fully occupied with its established links and traffic and no additional links can be maintained). The congestion may occur, for example, as each possible link that is maintained by a node-pair consumes some radio resources, even if there is no traffic flowing over the link. This reduces the traffic capacity that the node can provide to other nearby nodes. The nodes near the network access point cannot afford to maintain links to all their visible neighbors as this would be inefficient (as all the radio resources may be occupied maintaining links without room for traffic). Thus, when considering the routing, the node must also consider the congestion along the route.

Thus, the route is selected in step 50 that has the minimum cost to a node that is not congested and that is already linked to the congested node that is closest to the desired end node (or the receiving end node itself). This choice minimizes the use of radio resources and packet delay and also minimizes congestion at the nodes nearest the network access point.

This routing to a node neighboring the congested node avoids directly adding congestion to the congested node. As there is already traffic from the neighbor to the congested node, the additional packet may be added most efficiently to the existing traffic. Choosing the neighboring node allows the traffic to be sent to the congested node using an existing link and hence without causing it to use extra resources to support another (new) link. This choice has the effect of backing off the congestion to the next node in the route.

When initially routing a packet, the node may consider network factors in addition to the usage of radio resources along the route. To avoid congestion, the routing may also be selected to balance the flow of traffic across multiple links. Thus, if the information in the routing table indicates that more than one route may be used with equivalent (or nearly equivalent) cost, the node may select the route to balance the flow of traffic among the possible routes.

When a node receives a packet from a neighbor, as specified in step 60, for forwarding onwards across the network, the node evaluates the proposed routing against its own version of the network routing table. The node calculates the cost and delay sum of the route proposed by the sender and compares this against the alternatives (if any) in its table. If the node's table includes more recent information than the sender's (as determined by a time stamp in the node's own routing table in contrast to a time stamp received with the packet from the neighbor), and a lower cost route is found, the node may elect to change the routing information received with the data packet based on the new cost sum from its own routing table. Generally, the node uses the routing time information provided by the sender together with the packet to judge if its routing table information supersedes the routing selected by previous nodes. The packet is then forwarded to the next node in the route, together with the routing information (either the original if the route is not changed or the new information if it is changed).

Each wireless network node along the route, in the described embodiment of the invention, includes logic to prompt it to re-evaluate the routing and to make adjustments if the wireless network node has additional routing information or the network conditions have changed while the packet was in transit. This aspect makes the routing robust against errors in the routing tables in the network nodes and adaptive to changes in the network capabilities. This aspect also allows the network to include nodes with widely varying amounts of information in the routing tables (or even operate with nodes that contain a very simple (minimal) local routing table). As long as the node can forward a packet to another node along the route, or initiate a route by sending a packet to its appropriate neighbor, when the packet passes through a node with additional routing information, the routing will be adapted to the latest optimum conditions of the network. Thus, the network is made robust to routing information and changes in the capability and connectivity.

The nodes and the network may function with routing table information that ranges from simply information about the nearest neighbors to including information for a full network map and capability. The timely updating of the information in the routing tables is not critical to the success of the routing across the network. If a node in the proposed routing becomes inoperative, the routing will be altered by other nodes along the route as they become aware of the changed network structure. Thus, the routing of packets will automatically adapt to changes that occur in the network after their initial routing is selected, or if the initial routing was based on invalid information in the routing table. The routing tables may be updated at a later time (perhaps triggered by the observed change of routing) and so there is no dependency on timely distribution of routing information to maintain optimum routing of packets.

With traditional routing processes, with each node re-evaluating and possibly changing the routing of the packets, there is a danger of circular routing (i.e., the packet may be re-routed back to the initiating node, where it would be re-routed out along the original path, causing it to be re-routed back to the start again, etc.). This is undesirable as the packet will fail to reach its destination and may be endlessly circulated about the network consuming resources unnecessarily. There are a number of methods that are traditionally applied to prevent circular routing. For example, when a node is re-routing a packet it should check that the new route does not include the initial source node of the packet. The node can make this check as the initial node is included as part of the routing information sent with the packet. If the proposed new route does include the source node, then another alternate route should be selected. However, this solution requires that the re-routing node perform extra processing to check for possible circular routing.

The invention described herein precludes circular routing through the use of the timing information included with the packets. The packets are sent together with information about the time of the latest information used to develop the route (as described above). Nodes along the route will only re-route the packet if they have more recent information about the links for the route. If they do re-route the packet, they will indicate the new time of the routing information together with the packet. Thus, even if a re-routing does cause the packet to travel back to its source node, the source node will not change the routing as its information will be superseded by the updated routing time information provided with the packet (unless, of course, the source node has even more recent information about the route). In addition to preventing circular routing, this method also allows the network to better respond to changes in the connectivity in that changes in routing as a result of loss of links can be accommodated by freely re-routing around the broken connections.

The routing table is contained in memory of the communications controller unit 44 of FIG. 2 and contains information used by the routing processes. The routing table contains information about the routes available between nodes in the network, the cost of these routes in terms of data rate and efficiency, and the time the route information was measured. The table may contain information about all the routes possible in the network, or it may contain less information. Some nodes may operate with a table that only contains information about routes to a few of their nearest neighbors.

The routing update process is used both to fill in the information in the table initially and to update the table based on local measurements or information received from other nodes in the network. Initially, the table will contain only information about the links from the node to its nearest neighbors. As the node exchanges information with these other nodes, it will be able to also make entries about the cost (for example, rate and efficiency) of these links. As the link cost information becomes available to the node it will enter it in the table and will send it to its neighboring nodes in the network. The node will also receive information from other nodes in the network about available links and their cost in other places in the network. The routing table update process will enter this new information in the table (together with time information). The entry of information into the routing table may be achieved in a plurality of manners. The information about the links discovered for the neighboring nodes may be used to form the basis for the entries in the routing table.

The initial packet routing process is used to route packets that have been received by the node from its access links. The initial routing process will choose a route based on the information in the routing table and choose a route that minimizes the route cost (as described previously). The packet will then be sent to the appropriate neighboring (or distant neighbor) node to begin its journey.

The transit packet routing process is used to check the routing and forward packets received over the transit links to the node from its neighbors. This will occur according to the process described previously under the third aspect of routing. The packet will then be sent to the appropriate neighboring node to continue its journey. If the node decides to re-route the packet as a result of more or later information in its routing table, the transit packet routing process may use aspects of the initial routing process to select the new routing.

FIG. 4 is a flow chart illustrating a method according to one embodiment of the invention. Initially, a wireless network node creates a link table describing cost and efficiency information (step 61). The wireless network node adds information to the table based on local link conditions (step 62). The wireless network node also adds information to the table based on link information received from neighbor wireless network nodes, i.e., neighbors (step 64). Each time the wireless network node adds information to the table, the wireless network node adds a time stamp, or time of entry information to the table (step 66). Finally, the process of FIG. 4 includes sending information about links including time of entry to neighbor wireless network nodes (step 68). Each of the steps described herein are similar to what was described previously.

FIG. 5 is a flow chart illustrating one aspect of a method according to one embodiment of the invention. Initially, a wireless network node creates an initial route for a packet (step 70). The wireless network node then evaluates a cost function for each possible route to a network access node (step 72) and selects the lowest cost route (step 74). Upon selecting the lowest cost route, the wireless network node adds route and time of route information to the packet(s) (step 76) and sends a combined packet having traditional header information and the added header information onto the first link of the selected route (step 78). Each of the steps described herein are similar to what was described previously.

Figure 6:
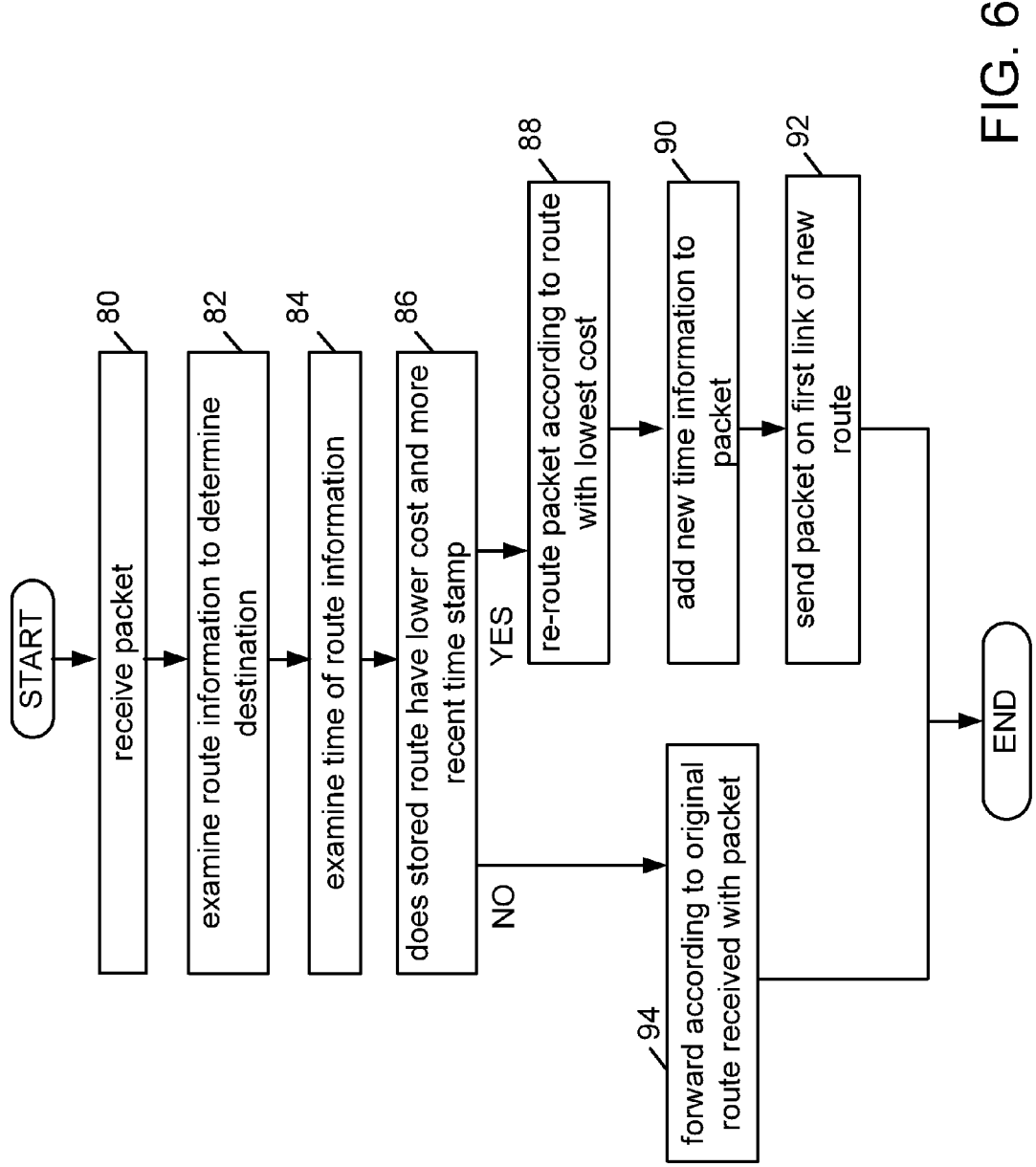
FIG. 6 is a flow chart illustrating one aspect of a method for receiving and routing a data packet according to one embodiment of the present invention.

FIG. 6 is a flow chart illustrating one aspect of a method for receiving and routing a data packet according to one embodiment of the present invention. Initially, a wireless network node receives a data packet (step 80). The wireless network node then examines route information received with the data packet to determine a destination of the packet (step 82). The wireless network node further examines a received time stamp that was received with the data packet (step 84). The wireless network node then determines if there is a difference in the received route information and wireless network node's stored route information (previously stored in the link table)

to the network access controller (or final destination within the multi-hop network) and, if so, whether the access controller's stored route information has a lower cost as well as a more recent time stamp (step 86). If so, the wireless network node re-routes the data packet accordingly along the route with the lowest cost as defined within its own link table (step 88). The wireless network node further adds new time information to the packet (step 90) and sends the data packet on the first link of the new route (step 92). If the wireless network node does not determine that there is a difference in the received route information or if the received route information has a more current time stamp, the wireless network node routes the data packet according to original route information received with the packet (step 94).

Figure 7:
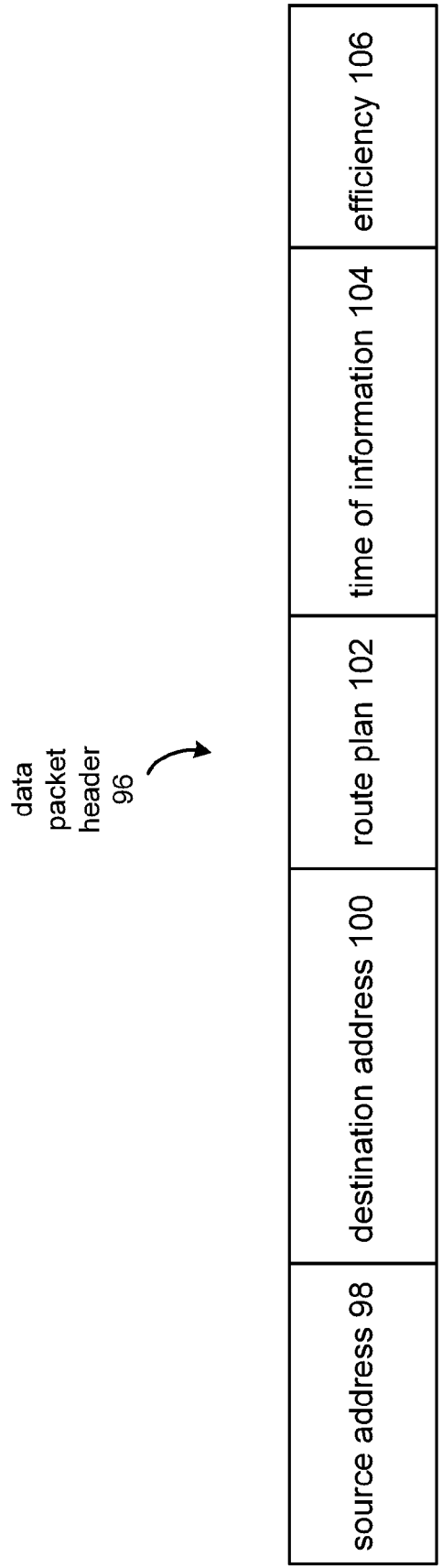
FIG. 7 is a functional signal diagram illustrating one aspect of a data packet header according to one embodiment of the present invention.

FIG. 7 is a functional signal diagram illustrating one aspect of a data packet header according to one embodiment of the present invention. A data packet header 96 comprises a source address field 98 for storing an address of an original source that is transmitting the data packet. A destination address field 100 for storing a destination address of a final destination packet. Additionally, the signal data packet header 96 includes a route plan field 102 for storing the route plan, a time of information field 104 for storing a time stamp reflecting when the link table from which the route plan was derived was last updated, and an efficiency field 106 for transmitting data relating to network efficiency. The use of an efficiency field 106 is optional and is utilized in only some embodiments of the present invention. In one embodiment of the invention, for example, efficiency field 106 carries time of transmission data for at least one wireless network node so that the timing for transmission through a link may be determined as a part of calculating a link's efficiency. In another embodiment, at least two time values are transmitted within efficiency field 106. A first time value reflects one of a total transmission time that is updated by every wireless network node or a transmission time of the initiating node so that a total time may be calculated. A second time value reflects the transmission time of the data packet from the previous wireless network node. Accordingly, a wireless network node or a network access node may evaluate the value(s) in the efficiency field to determine a total route efficiency as well as an efficiency of a previous link.

While FIG. 7 illustrates the use of an optional efficiency field 106, some of the data contemplated for transmission therein may also be transmitted in a separate data word or alternatively as a part of a different field. For example, time of transmission or total transmission data may be transmitted along with the routing data wherein each wireless network node updates transmission time data as a data packet either is received or transmitted to support the same types of efficiency calculations.

In one embodiment, the route plan stored in route plan field 102 includes a list of the sequence of nodes the packets are to traverse to reach their destination. The time stamp stored in time of information field 104, in one embodiment, includes the time of the information used in developing the route. The routing sequence does not include the plan for the links already traversed in one embodiment. Thus, the list of the sequence of nodes (the route plan) would shrink (by one entry) at each intermediate node in the route. This arrangement would be preferable as it reduces the amount of extension information to be transported. The time information should preferably include the time of receipt at the originating (or re-routing) node of the cost function information for each of the links in the proposed route.

With the described header information, intermediate nodes are able to develop re-routing plans when they have more recent information about any of the links in the proposed route. This further enables optimal re-routing as the intermediate nodes would be able to re-evaluate each link in the route. However, in order to reduce the amount of information transmitted for the routing process, in one embodiment, time of information field 104 includes just a single time reflecting the most recent information used in developing the route. This enables the intermediate nodes to re-route only if they have information about a link in the route that is newer than the newest information at the originating (or re-routing) node. This approach would be less optimal in routing, but more economical in the amount of information transported across the network. Alternatively, a plurality of time stamp values may be provided reflecting the time that any one link status was updated in the link table of the originating and intermediate wireless network nodes.

The routing and timing information could be sent together with the packets in the network in a number of ways. In one embodiment, the routing and timing information is appended to the information to the packets being sent and is marked as an extension to the standard header. In a general network, some of the intermediate nodes may not be equipped with the necessary routing capabilities to make use of the extended information. These nodes would ignore the extension information in the header, and pass along the packet according to their usual process (e.g., based on destination address route to the next neighbor in that direction). Intermediate nodes that are equipped with the additional routing capabilities are able to recognize the extension information and make use of it to confirm or alter the routing as they determine from their most recent routing information and the extension information included with the packet.

Figure 8:
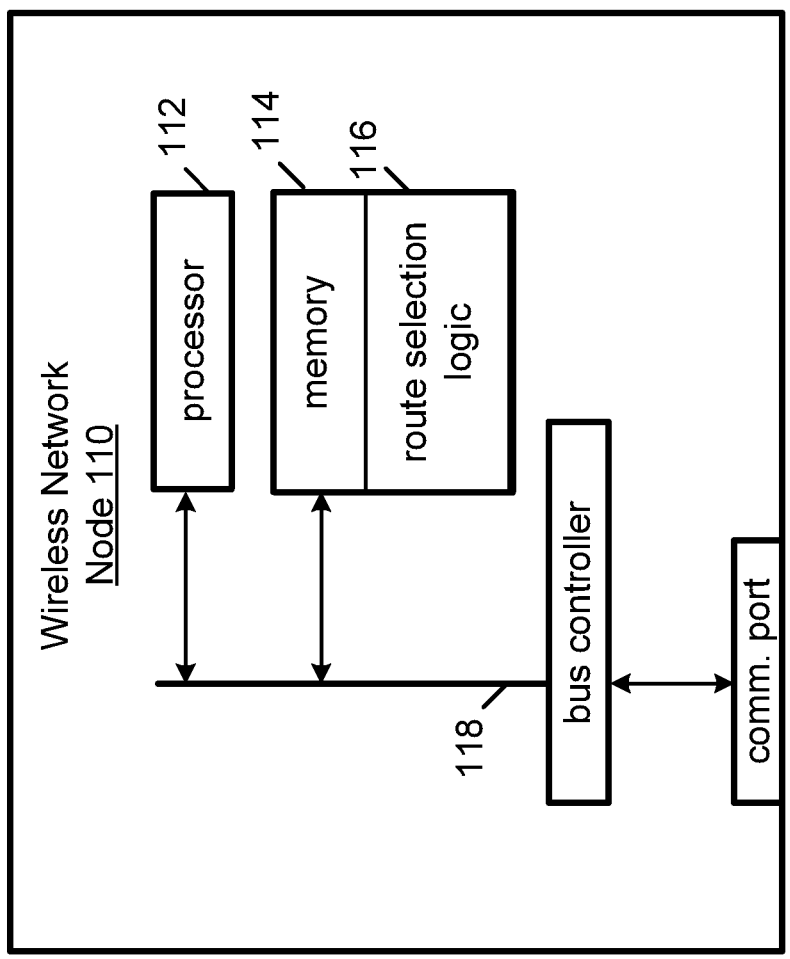
FIG. 8 is a functional block diagram illustrating a wireless network node formed according to one embodiment of the invention.

FIG. 8 is a functional block diagram illustrating a wireless network node formed according to one embodiment of the invention. A wireless network node 110 includes a processor 112 that is coupled to receive computer instructions stored within a memory 114 and, more particularly, within a memory portion 116 that includes computer instructions retrieved from memory 114 by way of a bus 118 that define operational logic for selecting a route as described herein. Generally, memory 114 includes computer instructions that define operational logic for the wireless network node including instructions that relate to routine operations of the wireless network node. Additionally, the computer instructions in memory portion 116 define logic as described in each of the above described method steps and logic to result in operation as described according to the various embodiments of the invention including, for example, the operation of wireless network nodes as described in relation to FIGS. 1-7 herein. Generally, the computer instructions include logic for the wireless network node to create and update a link table (or equivalent thereof), to route traffic and data packets according to a lowest cost route, to generate route and time stamp information with the data packets and to update or modify a specified route for a data packet under specified conditions described herein this application.

The invention disclosed herein is susceptible to various modifications and alternative forms. Specific embodiments therefore have been shown by way of example in the drawings and detailed description. It should be understood that the drawings and detailed description thereto are not intended to limit the invention to the particular form disclosed, but on the contrary, the invention is to cover all modifications, equivalents and alternatives falling within the spirit and scope of the present invention as defined by the claims. For example, if base stations are interconnected with wireless links, their operation could readily be modified to included the inventive concepts disclosed herein in which the wireless network nodes in the description operate according to CDMA (or GSM or AMPS) radio standards acting as the access radio (instead of the 802.11 as disclosed herein). Alternatively, if a fiber interconnect is used among the base stations (or wireless network nodes) in a mesh, then the same principles could be used for choosing a route among the multiple routes provided by the fibers or the channels in the fibers.

What is claimed is:

1. A network node, comprising:
at least one transceiver for transmitting and receiving signals; and
at least one controller, the at least one controller being operable to create a network information table by:
determining link conditions from local link conditions to produce determined link conditions, the determined link conditions including transmission rate information, link efficiency information, and node delay information for each of a plurality of available links to the network node;
receiving determined neighboring link conditions from neighboring network nodes available to the network node, wherein the determined neighboring link conditions include transmission rate information, efficiency information and node delay information for links of each of the neighboring network nodes;
creating the network information table based on the determined link conditions and the determined neighboring link conditions;
transmitting the network information table to the neighboring network nodes; and
when the determined link conditions or the determined neighboring link conditions indicate a network change condition:
updating the network information table with the determined link conditions and with a time stamp indicating a table update time so as to facilitate compensation for possible errors in the network information table; and
transmitting the updated network information table to the neighboring network nodes; and
determining a cost function associated with each of the plurality of the available links, wherein the cost function calculates a cost of each of the plurality of the available links by summing a radio transmission time at each of the plurality of the available links, wherein the radio transmission time is calculated from a quotient of a packet size of a packet and the transmission rate information multiplied by the link efficiency information.

2. The network node of claim 1, wherein the at least one controller is further operable to select a route for a data packet, wherein the selected route is based on the cost function associated with each of the plurality of the available links for the selected route being lower than any other route.

3. The network node of claim 2, wherein the at least one controller is further operable to forward the data packet onto a first link to a first hop corresponding to the selected route.

4. The network node of claim 3, wherein the at least one controller is further operable to transmit route information with the data packet.

5. The network node of claim 4, wherein the route information is placed in an appended header.

6. The network node of claim 4, wherein the at least one controller is further operable to transmit a second time stamp corresponding to the route information.

7. The network node of claim 6, wherein the second time stamp corresponding to the route information is placed in an appended header.

8. A network node, comprising:
at least one transceiver for transmitting and receiving signals; and
at least one controller, the at least one controller being operable to select a route for a packet by:
generating a network information table including link information on one or more available links for a source node and a destination node, the link information on the one or more available links including linked nodes, transmission rate between the source node and the destination node, link efficiency information, node delay, and a time stamp indicating when the link information was determined; calculating a cost of each of the one or more available links for the packet from the source node to the destination node, the cost calculated by summing a radio transmission time at the one or more available links, wherein the radio transmission time is calculated from a quotient of a packet size of the packet and the transmission rate multiplied by the link efficiency information;
selecting a lowest cost route as the route based upon the cost calculation of each of the one or more available links;
storing a second time stamp indicating when the lowest cost route was determined; and
transmitting the packet, via the at least one transceiver, over the route with information regarding the lowest cost route and the second time stamp.

9. The network node of claim 8, wherein the at least one controller is operable to transmit the packet onto a first link of the lowest cost route.

10. The network node of claim 9, wherein the cost calculation of each of the one or more available links of the route and the second time stamp are transmitted as a part of an appended header of the packet.

11. The network node of claim 9 wherein the cost calculation of each of the one or more available links of the route and the second time stamp are transmitted as a part of an appended header of the packet.

12. The network node of claim 9 wherein the cost calculation of each of the one or more available links of the route and the second time stamp are transmitted as a part of a dedicated signal for transporting route and time stamp information.

13. A network node, comprising:
at least one transceiver for transmitting and receiving signals; and
at least one controller, the at least one controller being operable to select a route for a packet by:
providing a network information table including link conditions of the network node and neighboring link conditions of neighboring nodes, the link conditions and the neighboring link conditions each including transmission rate information, link efficiency information, queue delay information, and a time that the link conditions were determined;
calculating, based on the network information table, a cost of alternate routes available to the network node relative to an original route for the packet from a source network node to a destination node, the cost of the alternate routes calculated by summing a radio transmission time at each of the alternate routes, wherein the radio transmission time is calculated from a quotient of a packet size of the packet and the transmission rate information multiplied by the link efficiency information;
determining whether an alternate route of the alternate routes has a lower cost than the original route; and
when the network node has more recent network information from the network information table, transmitting via the at least one transceiver the packet along the alternate route of the alternate routes having the lower cost.

14. The network node of claim 13 further comprising transmitting the more recent network information with the packet.

15. The network node of claim 13 further comprising transmitting a time of the more recent network information.

16. A network node, comprising:
at least one transceiver for transmitting and receiving signals; and
at least one controller, the at least one controller being operable to select a route for a packet by:
maintaining a network information table;
determining a plurality of available links for routing the packet from a source node to a destination node;
determining a cost function associated with each of the plurality of the available links, wherein the cost function calculates a cost of each of the plurality of the available links by summing a radio transmission time at each of the plurality of the available links, wherein the radio transmission time is calculated from a quotient of a packet size of the packet and link transmission rate information multiplied by link efficiency information; and
choosing a route for the packet based on the cost function associated with each of the plurality of the available links from the network information table.

* * * * *

UNITED STATES PATENT AND TRADEMARK OFFICE
CERTIFICATE OF CORRECTION

PATENT NO. : 9,131,433 B2  Page 1 of 1
APPLICATION NO. : 13/424523
DATED : September 8, 2015
INVENTOR(S) : Steer et al.

It is certified that error appears in the above-identified patent and that said Letters Patent is hereby corrected as shown below:

On the title page, item [54] and in the specification, column 1, line 1-3 should read
"Minimization of Radio Resource Usage in Multi-Hop Networks with Multiple Routings"

Signed and Sealed this
Ninth Day of February, 2016

Michelle K. Lee
*Director of the United States Patent and Trademark Office*